US012427661B2

(12) United States Patent
Kaehler et al.

(10) Patent No.: US 12,427,661 B2
(45) Date of Patent: Sep. 30, 2025

(54) ANOMALY DETECTION IN LATENT SPACE REPRESENTATIONS OF ROBOT MOVEMENTS

(71) Applicant: SANCTUARY COGNITIVE SYSTEMS CORPORATION, Vancouver (CA)

(72) Inventors: Adrian Kaehler, Campbell, CA (US); Jeff Kranski, Campbell, CA (US); Chris Cianci, Campbell, CA (US)

(73) Assignee: Sanctuary Cognitive Systems Corporation, Vancouver (CA)

( * ) Notice: Subject to any disclaimer, the term of this patent is extended or adjusted under 35 U.S.C. 154(b) by 744 days.

(21) Appl. No.: 17/474,454

(22) Filed: Sep. 14, 2021

(65) Prior Publication Data

US 2023/0078625 A1    Mar. 16, 2023

(51) Int. Cl.
*B25J 9/16* (2006.01)
*B25J 19/02* (2006.01)
*G06F 18/23* (2023.01)

(52) U.S. Cl.
CPC .............. *B25J 9/1653* (2013.01); *B25J 9/163* (2013.01); *B25J 9/1682* (2013.01); *B25J 9/1689* (2013.01); *B25J 19/023* (2013.01); *G06F 18/23* (2023.01)

(58) Field of Classification Search
CPC ........ B25J 9/1653; B25J 9/163; B25J 9/1682; B25J 9/1689; B25J 19/023; G06F 18/23; G06V 10/762; G06V 10/82; G06V 20/56; G06V 30/19093; G05B 2219/33056; G05B 2219/40174
See application file for complete search history.

(56) References Cited

U.S. PATENT DOCUMENTS

| 10,766,137 | B1 * | 9/2020 | Porter ..................... G06N 3/04 |
| 2017/0124476 | A1 * | 5/2017 | Levinson ............... G06V 20/58 |
| 2018/0341836 | A1 * | 11/2018 | Lim ..................... G06F 18/2413 |
| 2019/0108448 | A1 * | 4/2019 | O'Malia .................. G06N 3/04 |

(Continued)

OTHER PUBLICATIONS

Mehling et al., "Centaur: NASA's Mobile Humanoid Designed for Field Work", 2007 IEEE International Conference on Robotics and Automation, Roma, Italy, Apr. 10-14, 2007 (Year: 2007).*

(Continued)

*Primary Examiner* — Thomas E Worden
*Assistant Examiner* — Elizabeth Rose Neleski
(74) *Attorney, Agent, or Firm* — Adenike Adebiyi; Thomas Mahon

(57) ABSTRACT

Provided is a process, including: obtaining, with a computer system, access to a specification indicating which regions of an embedding space are designated as anomalous relative to vectors in the embedding space characterizing past behavior of a first instance of a dynamical system; receiving, with the computer system, multi-channel input indicative of a state of a second instance of the dynamical system; and classifying, with the computer system, whether the state of the second instance of the dynamical system is anomalous by: encoding the multi-channel input into a vector in the embedding space; causing the specification to be applied to the vector; obtaining a result of applying the specification to the vector; and classifying whether the state of the second instance of the dynamical system is anomalous based on the result; and storing the classification in memory.

24 Claims, 5 Drawing Sheets

(56) References Cited

U.S. PATENT DOCUMENTS

| | | | |
|---|---|---|---|
| 2019/0135300 A1* | 5/2019 | Gonzalez Aguirre | G06N 20/00 |
| 2021/0081752 A1 | 3/2021 | Chao et al. | |
| 2021/0165415 A1* | 6/2021 | Lee | A01D 34/86 |
| 2021/0252698 A1 | 8/2021 | Paxton et al. | |
| 2021/0253128 A1 | 8/2021 | Nister et al. | |
| 2021/0357782 A1 | 11/2021 | Graves et al. | |
| 2021/0387330 A1 | 12/2021 | Mavrin et al. | |
| 2022/0016766 A1 | 1/2022 | Humayun et al. | |
| 2022/0035973 A1 | 2/2022 | Liebman et al. | |
| 2022/0051138 A1 | 2/2022 | Stoll et al. | |
| 2022/0084272 A1 | 3/2022 | Wang et al. | |
| 2022/0101627 A1 | 3/2022 | Pappas et al. | |
| 2022/0129666 A1* | 4/2022 | Cherian | G06V 10/50 |
| 2022/0402123 A1* | 12/2022 | Niemueller | B25J 9/1661 |

OTHER PUBLICATIONS

Internet Archive of "Transfer Learning," Wikipedia, https://web.archive.org/web/20210331015532/https://en.wikipedia.org/wiki/Transfer_learning, Mar. 31, 2021, pp. 1-5.

* cited by examiner

ANOMALY DETECTION IN LATENT SPACE REPRESENTATIONS OF ROBOT MOVEMENTS

CROSS-REFERENCE TO RELATED APPLICATIONS

No cross-reference is presented at this time.

BACKGROUND

1. Field

The present disclosure relates generally to robotics and, more specifically, to machine-learning models for controlling robots.

2. Description of the Related Art

In recent years, capabilities of robotic systems have been improved through the use of machine learning. Reinforcement learning has been applied to robots to help robots learn to complete some tasks. Reinforcement learning allows a robot to learn how to complete a task through many trial-and-error attempts at completing the task. The robot is able to learn through reward mechanisms that reward the robot when a task is performed correctly and penalize the robot when a task is not performed correctly. Through repeated actions the robot is able to learn to perform actions that maximize the reward and avoid actions that lead to penalties or lower rewards.

SUMMARY

The following is a non-exhaustive listing of some aspects of the present techniques. These and other aspects are described in the following disclosure.

Some aspects include a process including: obtaining, with a computer system, access to a specification indicating which regions of an embedding space are designated as anomalous relative to vectors in the embedding space characterizing past behavior of a first instance of a dynamical system; receiving, with the computer system, multi-channel input indicative of a state of a second instance of the dynamical system; and classifying, with the computer system, whether the state of the second instance of the dynamical system is anomalous by: encoding the multi-channel input into a vector in the embedding space; causing the specification to be applied to the vector, obtaining a result of applying the specification to the vector; and classifying whether the state of the second instance of the dynamical system is anomalous based on the result; and storing, with the computer system, the classification in memory.

Some aspects include a process including: determining a sequence of embeddings, wherein each embedding of the sequence of embeddings indicates a previously observed state of the robot (e.g., a position of the robot, an orientation of an object being manipulated by the robot, the presence or absence of objects in an environment, changes in power consumption by the robot, contact forces measured by the robot, etc.), wherein the sequence of embeddings is associated with a task that the robot has been instructed to complete; determining, based on the sequence of embeddings and based on a reinforcement learning model trained for performing the task, an action for the robot to perform; causing the robot to perform the action; obtaining sensor data of the robot (e.g., image data, data from inertial measurement units, data from tactile sensors, data from depth cameras, etc.), wherein the sensor data comprises an indication of a position of a joint of the robot; generating, based on inputting the sensor data into an embedding model, a first embedding indicating a state of the robot after performing the action; determining, based on inputting the first embedding into an anomaly detection model, that the first embedding corresponds to an anomaly; and in response to determining that the first embedding corresponds to an anomaly, preventing the robot from performing additional actions associated with the task.

Some aspects include a tangible non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
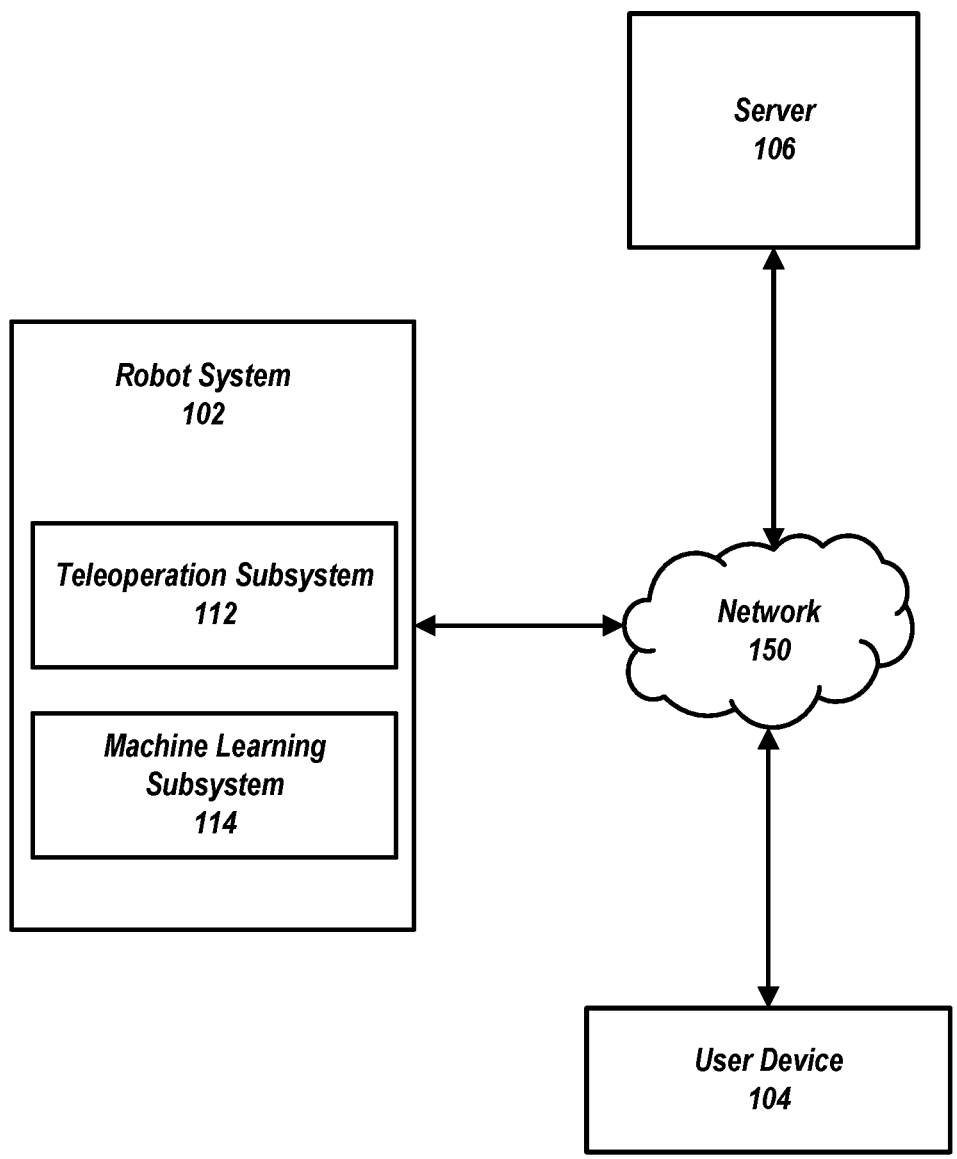
FIG. 1 shows an example computing system for detecting anomalous states in movement trajectories, in accordance with some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION

In the following description, for the purposes of explanation, numerous specific details are set forth in order to provide a thorough understanding of the disclosure. It will be appreciated, however, by those having skill in the art, that the disclosure may be practiced without these specific details or with an equivalent arrangement. In other cases, well-known structures and devices are shown in block diagram form to avoid unnecessarily obscuring the disclosure. To mitigate the problems described herein, the inventors had to both invent solutions and, in some cases just as importantly, recognize problems overlooked (or not yet foreseen) by others in the fields of teleoperation, robotics, and machine learning (e.g., reinforcement learning). Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Despite recent advances in robotics and machine learning, it is still difficult to train a robot to perform tasks. It may take a long time to train a robot to perform a task and even after training a robot may not perform a task consistently. In some cases, errors may occur and robots may perform actions that may damage themselves or other objects. For example, a robot may walk into a wall, swing an arm too fast causing the robot to drop expensive equipment, or cause other accidents. Additionally, some actions performed by a robot may cause the robot to reach a state of singularity (e.g., a condition caused by the collinear alignment of two or more robot axes resulting in unpredictable robot motion and velocities), which may prevent the robot from completing a task that has been assigned to the robot. A mechanism that is able to detect when a robot is performing an error or an undesired movement may be helpful for improving the robot's ability to complete tasks and prevent damage.

To address these and other issues, a computing system may use an anomaly classification model, such as an anomaly detection model to determine anomalous behavior of a robot. The computing system may use the anomaly detection model to determine that a state of the robot (e.g., joint positions, angles, the environment around the robot, etc.) is not similar to a state that would normally be seen in a robot that is successfully completing a task. Detecting that the robot is in an anomalous state may improve the computing system's ability to prevent damage to the robot (e.g., by preventing the robot from moving in a way that causes damage to itself). Detecting anomalous states of the robot may also increase the efficiency of the robot because it may lead to less interruptions of the robot while completing a task. For example, the robot may be more efficient because it is able to spend more time completing a task and less time in troubleshooting or maintenance. Additionally, detecting anomalous states of the robot may enable improved predictive maintenance because actions by the robot that fall outside of expected bounds may be detected more easily.

A computing system may determine a sequence of latent space embeddings that encode information sensed by the robot at various stages of performing a task. The latent space embeddings ("embeddings") may be vector representations of sensor data at various positions a robot should enter into throughout the performance of the task. The embeddings may include representations (e.g., lower-dimensionality representations) of the state (e.g., of the robot or the robot's surroundings) that encode information about the robot (e.g., data generated via one or more sensors of the robot), a task, or an environment that the robot is located in. For example, the computing system may determine a sequence of embeddings associated with loading boxes into a truck. In this example, the sequence of embeddings may include a vector representation of information sensed by a sensor suite of the robot as it performs tasks like grab a box, lift a box, walk to the truck with the box, and place the box in the truck. In some cases, multiple channels of sensor data may be segmented into a plurality of time-slices, each time-slice having the sensor output or an embedding vector formed by the encoder to encode the sensor output (the vector itself also being an example of sensor output). The encoder model may use the sensor data to generate an embedding (e.g., a vector representation) indicating the state of the robot or the environment around the robot periodically (e.g., 30 times per second, 10 times per second, every two seconds, etc.). An embedding may indicate a current position or state of the robot (e.g., the state of the robot after performing an action to turn a door handle. An embedding may reduce the dimensionality of data received from sensors. For example, if the robot has multiple color 1080p cameras, touch sensors, motor sensors, or a variety of other sensors, then input to an encoder model for a given state of the robot (e.g., output from the sensors for a given time slice) may be tens of millions of dimensions. The encoder model may reduce the sensor data to an embedding in an embedding space (e.g., a space between 10 and 2000 dimensions in some embodiments). Distance between a first embedding and a second embedding may preserve the relative dissimilarity between the state of a robot associated with the first embedding and the state of a robot (which may be the same or a different robot) associated with the second embedding.

The computing system may use the embeddings to determine an action for the robot to perform. For example, the computing system may use the embeddings to determine that the first action the robot should perform to complete the task of loading boxes into a truck should be to grab a box. The computing system may obtain sensor data of the robot, for example, after the robot performs an action. For example, after performing a movement to grab the box, the computing system may obtain sensor data of the robot (e.g., images from cameras of the robot, sensor data indicating a position of an arm, leg, or other part of the robot, etc.).

The computing system may generate an embedding using the obtained sensor data. The embedding may indicate a current position or state of the robot (e.g., the state of the robot after performing an action to grab a box). The computing system may use the embedding as input into an anomaly detection model to determine whether the embedding is an anomaly. For example, an embedding may be representative of sensor data that indicates a motor in the robot is not functioning properly. The anomaly detection model may determine that the embedding is an anomaly and, in response, that the robot is in an anomalous state. In response to determining that the embedding corresponds to an anomaly, the computing system may prevent the robot from performing additional actions associated with the task (e.g., to prevent damage to the robot). For example, after performing the action to grab the box, the computing system may detect an anomaly because an embedding indicating a state of the robot is determined to be different (e.g., by more than a threshold) from one or more embeddings previously observed (e.g., one or more embeddings observed during training of a machine learning model). By detecting the anomaly, the computing system may prevent the robot from performing additional actions, which may prevent damage to the robot's arm.

FIG. 1 shows an example computing system 100 for using machine learning to detect anomalies in trajectories of robots. A trajectory may include a sequence of states or observations that the robot enters into during the performance of one or more actions. Additionally or alternatively, a trajectory may include a sequence of actions that a robot performs to complete a task. A sequence of states or actions may be indicated by a sequence of vector representations (e.g., embeddings) that map sensor data of the robot to multidimensional vector space. For example, there may be one or more vector representations corresponding to each step of a task (e.g., changing a tire). The computing system 100 may obtain an anomaly detection model trained on a set of sequences of embedding vectors. Each member of the set of embedding vectors may correspond to an instance in which a robot previously performed a task. For example, each member may correspond to an instance where a robot changed a tire on a vehicle. Each embedding vector may encode a plurality of channels of sensor data of an instance of the robot in an embedding space. For example, the sensor data may include images (e.g., including video) taken from cameras located on the robot. Each sequence of the set of sequences may have embedding vectors corresponding to different movements the robot enters into while completing the task. For example, there may be movements including removing a tire from the wheel, grabbing a new tire, and placing the new tire on the wheel. The instances of the robot may be configured to input data from the plurality of channels of sensor data into an encoder. The encoder may be configured to transform the input into an embedding vector in the embedding space and may provide the resulting embedding vector to a reinforcement learning model. The reinforcement learning model may be configured to control the robot in response to the resulting embedding vector. For example, an embedding may indicate that an old tire has been successfully removed from the wheel. In response, the reinforcement learning model may cause the robot to grab the new tire to place on the wheel. The computing system 100 may obtain a new embedding vector from a given instance of the robot performing the task. The computing system 100 may classify the new embedding vector as anomalous and, in response, determine that the robot is making an anomalous movement. For example, the robot may have moved in the opposite direction from where the new tires are located, which may cause an embedding of the state of the robot to indicate there is an anomaly. The computing system 100 may store a result of the determination in memory.

The computing system 100 may include a robot system 102, a user device 104, and/or a server 106. The robot system 102 may include a communication subsystem 112, a machine learning (ML) sub system 114. The ML subsystem 114 may include a plurality of machine learning models. For example, the ML subsystem 114 may pipeline an encoder and a reinforcement learning model that are collectively trained with end-to-end learning, the encoder being operative to transform relatively high-dimensional outputs of a robot's sensor suite into lower-dimensional vector representations of each time slice in an embedding space, and the reinforcement learning model being configured to update setpoints for robot actuators based on those vectors. Some embodiments of the ML subsystem 14 may include an encoder model, a dynamic model, an actor-critic model, a reward model, an anomaly detection model, or a variety of other machine learning models (e.g., any model described in connection with FIG. 2 and FIG. 4 below). Although shown as distinct objects in FIG. 1, functionality described below in connection with the robot system 102, the server 106, or the user device 104 may be performed by any one of the devices. Each of the robot system 102, the server 106, or the user device 104 may be implemented as one system or as separate systems. The robot system 102, the server 106, or the user device 104 may communicate with each other via the network 150.

The computing system 100 may determine a sequence of embeddings that indicate movements a robot should perform to complete a task. The embeddings may be vector representations of sensor data at various positions a robot should be in to perform a task. For example, the computing system may determine a sequence of embeddings associated with opening a door. In this example, the sequence of embeddings may include a vector representation corresponding to states the robot should be in to move towards the door, grab the door handle, turn the door handle, and pull on the door handle to open the door. For example, a first embedding may represent a state the robot is expected to be in while grabbing the door handle and an additional embedding may represent the state the robot is expected to be in after turning the door handle. There may be a number of embeddings between the first embedding and the additional embeddings that indicate the progressive turning motion of the robot's arm interacting with the door handle to turn the door handle.

The sequence of embeddings may have been previously generated by an instance of a robot and stored in memory. The sequence of embeddings may be generated via exchange of data between an encoder model, robot environment, actor-critic model, or other component (e.g., any other component described in connection with FIG. 2 and FIG. 4). The computing system 100 may use the sequence of embeddings to determine actions for the robot to perform. For example, the computing system may use the embeddings to determine that the first action the robot should perform to complete the task of opening the door is to move towards the door. The computing system 100 may cause the robot to perform the action. For example, an agent model (e.g., the agent 215 discussed in connection with FIG. 2) may output instructions to the robot system 102 (e.g., which may implement the robot 216 discussed in connection with FIG. 2) that cause the robot system 102 to perform the action.

The computing system 100 may obtain sensor data of the robot, for example, after an action or a portion of an action has been performed. The robot may send sensor data from sensors of the robot to the computing system 100 periodically (e.g., thirty times per second, 120 times per second, etc.) The sensor data may include images taken by one or more cameras of the robot. The sensor data may include servomechanisms, position data indicating the positions of one or more part of the robot, the positions of one or more parts of the robot relative to other parts of the robot, battery level, power consumption, or a variety of other information associated with the robot. The sensor data may include information obtained from a motor position sensor of the robot (e.g., located in an arm, joint, or other part of the robot system 102), a touch sensor located in a part of the robot system 102 (e.g., a finger of the robot system 102), camera data, depth data, or a motor current sensor of the robot. For example, as the robot moves towards the door, the computing system 100 may obtain sensor data including images showing the environment around the robot, data indicating positions of legs and arms of the robot, etc.

The computing system 100 may use the sensor data of the robot to generate embeddings. For example, the computing system 100 may use an encoder model (e.g., the encoder model 203) to generate the embeddings. The encoder model may use the sensor data to generate an embedding (e.g., a vector representation) indicating the state of the robot or the environment around the robot periodically (e.g., 30 times per second, 10 times per second, every two seconds, etc.). An embedding may indicate a current position or state of the robot (e.g., the state of the robot after performing an action to turn a door handle. An embedding may reduce the dimensionality of data received from sensors. For example, if the robot has multiple color 1080p cameras and multiple touch sensors, input to an encoder model for a given state of the robot may be tens of millions of dimensions. The encoder model may reduce the sensor data to an embedding in an embedding space (e.g., a space between 10 and 2000 dimensions in some embodiments).

The embeddings generated by the encoder may be input into an anomaly detection model (e.g., the anomaly detection model 209 of FIG. 2) to enable the computing system 100 to determine whether the robot has performed or is performing anomalous movements. An anomalous movement may be a movement that is determined to exceed a threshold difference from other movements that the robot or an instance of the robot have previously performed or a movement that is known to not be associated with the task that the robot is attempting to perform. By detecting anomalous embeddings and, in response, anomalous states of a robot, the computing system 100 may be able to prevent a robot from being harmed or from causing damage to objects within the environment of the robot. For example, during performance of a task, the robot system 102 may detect a person standing in front of a camera of the robot system 102. In this example, the robot system 102 may have never previously observed a person standing in front of the camera during performance of the task and, as a result, an embedding generated based on an image taken by the camera may be determined to be anomalous. In this example, the robot system 102 may pause before continuing the task, for example, because an embedding generated based on an image taken by the camera is different or determined to be anomalous when compared with other embeddings generated using previous images taken by the camera (e.g., previous images taken during training of the robot system 102). Additionally or alternatively, detecting anomalous movements may allow the computing system 100 to enable the robot to perform the task more efficiently by preventing the robot from moving in ways that introduce singularities into a kinematic chain of the robot.

The anomaly detection model may include a clustering model (e.g., K means, DB scan, or a variety of other machine learning models used for clustering). The anomaly detection model may take as input an embedding and determine whether it belongs to one or more other clusters of other embeddings that have been input into the anomaly detection model. The embeddings in the one or more other clusters may include embeddings corresponding to tasks that an instance of the robot has been trained to complete. The anomaly detection model may output information indicating that an embedding is an anomaly, for example, if the embedding is determined to not belong to an existing cluster of embeddings.

The anomaly detection model may be trained to determine an area in an embedding space (e.g., an embedding space of the embeddings generated by the encoder model) that corresponds to non-anomalous movements of the robot system 102. For example, an embedding that maps to a location outside of the area may be determined to be anomalous by the computing system 100. The area may be a multidimensional area within the embedding space.

The anomaly detection model may determine that an embedding corresponds to an anomaly using distance metrics. The anomaly detection model may generate similarity scores using a distance metric (e.g., Minkowski distance, cosine distance, Hamming distance, or a variety of other distance metrics) to compare a first embedding with other embeddings that have been determined to be non-anomalous. The computing system 100 may compare the similarity score with a threshold similarity score. The computing system 100 may determine that the first embedding corresponds to an anomaly (e.g., the first embedding may be classified as an anomaly), for example, if the similarity score fails to exceed the threshold similarity score. The computing system 100 may determine that the first embedding does not indicate anomalous movement of the robot, for example, if the similarity score exceeds the threshold similarity score.

The server 106 may train the anomaly detection model using data received from multiple instances of the robot system 102. There may be multiple robot systems 102 (e.g., tens, hundreds, thousands, etc.) that perform tasks and send data (e.g., sensor data, embeddings, etc.) to the server 106. The server 106 may use the data received from the multiple instances of robots to train the anomaly detection model. The server 106 may generate an updated anomaly detection model by training the anomaly detection model and may send the updated anomaly detection model to the robot system 102 or user device 104 for deployment. In some embodiments, the server 106 may use the data received from the multiple instances to determine an area in the embedding space that corresponds to anomalies. For example, the server 106 may determine an area in the embedding space such that embeddings that are outside the area correspond to anomalies and embeddings that are inside the area are not anomalies. The server 106 may send an indication of the area to the robot system 102 for use as an anomaly detection model.

In response to determining that the first embedding corresponds to an anomaly, the computing system 100 may cause the robot to perform an action or prevent the robot from performing an action, for example, to prevent the robot from harming itself or other objects. For example, the computing system 100 may prevent the robot from performing additional actions associated with the task (e.g., to prevent damage to the robot). The computing system 100 may be implemented such that a time of less than 100 milliseconds transpires between determining that an embedding corresponds to an anomaly and preventing the robot system 102 from performing further actions.

The robot system 102 may determine an action to take based on whether an embedding associated with the robot system 102 was determined to be anomalous or based on a severity level of the anomaly. For example, if a robot is determined to have made an anomalous movement the robot system 102 may continue performing the task if the anomaly is determined to be less severe than a threshold severity level associated with anomalous movements of the robot system 102. The anomaly detection model may output a score indicating whether an embedding is an anomaly. The score may be compared with a threshold score. The robot system 102 may continue performing the task, for example, if the score fails to satisfy the threshold score (e.g., is below the threshold score). The robot system 102 may stop performing actions (e.g., to wait for assistance from a human operator) associated with the task, for example, if the score satisfies the threshold score (e.g., exceeds the threshold score). The robot system 102 may determine to move to a charging station (e.g., a location where the robot system 102 is able to charge a battery of the robot system 102), for example, if the embedding is determined to be an anomaly. The robot system 102 may send an alert to the server 106, for example, if the embedding is determined to be an anomaly. The alert may include the embedding that was classified as an anomaly and sensor information from the robot. The server 106 may notify a human operator based on receiving the alert from the robot system 102 (e.g., so that the human operator can investigate the robot system 102).

In response to detecting that an embedding is anomalous, the computing system 100 may prompt a teleoperator to take over control of the robot system 102. In response to detecting an anomalous embedding, the server 106 or the robot system 102 may send a notification to the user device 104 indicating that an anomaly has been detected. The notification may indicate that a teleoperator should take over control of the robot system 102.

The server 106 may assist the robot system 102, for example, if the robot is determined to have made an anomalous movement or be in an anomalous state. The server 106 may determine one or more actions that the robot system 102 can perform to move from an anomalous state to a non-anomalous state. The server 106 may determine one or more actions based on actions performed by other instances of the robot system 102 or based on actions performed by teleoperators to return an instance of the robot system 102 to a non-anomalous state. For example, the server 106 may receive data (e.g., an embedding) that indicates the robot system 102 is in an anomalous state (e.g., that the robot system 102 has performed an anomalous movement). The server 106 may compare the data with other data (e.g., other embeddings) received from other instances of the robot system 102. The other data may include embeddings that were determined to be anomalous by other instances of the robot system 102. The anomalous embeddings may be associated with sequences of actions (e.g., performed by a teleoperator of an instance of the robot system 102) to change the robot from an anomalous state to a non-anomalous state. For example, the sequence of actions may remove a singularity in a kinematic chain of the robot, may return the robot to a safe location, etc. The server 106 may determine that an anomalous embedding with the data from the anomalous instances and determine that the anomalous embedding is a match (e.g., is within a threshold similarity score calculated using a distance metric) with an embedding. The server 106 may send a command to the robot system 102 to perform the sequence of actions that is associated with the embedding that matches the detected anomaly.

The robot system 102 may send a query to the server 106 in response to determining that an embedding of the robot system 102 is anomalous. The query may indicate a request for an action to perform to move the robot system from an anomalous state to a non-anomalous state. The query may include an embedding that has been determined to be anomalous. In response to sending the query to the server, the robot system 102 may receive a response that includes a sequence of actions that are associated with an additional anomalous embedding that has been determined to match the embedding contained in the query. The sequence of actions may have been performed by a teleoperator of another instance of the robot system 102 to change a state of the instance from anomalous to non-anomalous. The robot system 102 may perform the sequence of actions indicated in the response from the server 106.

Figure 2:
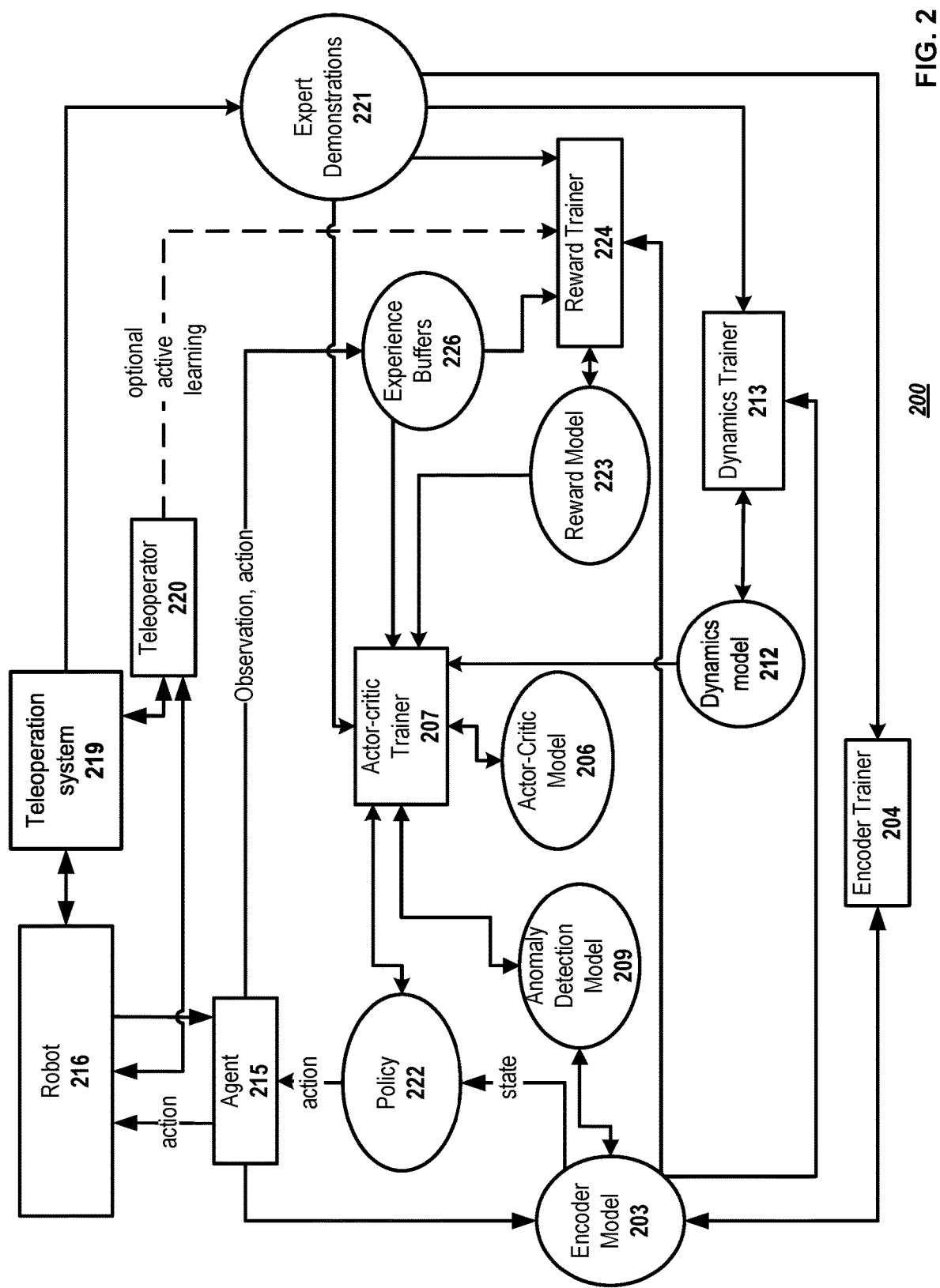
FIG. 2 shows an example system for detecting anomalous states in robot movement trajectories, in accordance with some embodiments.

FIG. 2 shows an additional example of a system for using machine learning to detect anomalous states (e.g., anomalous movements) in robots. One or more components shown in FIG. 2 may be implemented by the robot system 102, the user device 104, or the server 106 described above in connection with FIG. 1.

The system 200 may include a robot 216. The robot 216 may include any component of the robot system 102 discussed above in connection with FIG. 1. The robot may be a anthropomorphic robot (e.g., with legs, arms, hands, or other parts). The robot may be a self-driving car, a kitchen appliance, construction equipment, or a variety of other types of robots. The robot 216 may include one or more cameras, joints, servomechanisms, or any other component discussed in U.S. patent application Ser. No. 16/918,999, filed 1 Jul. 2020, titled "Artificial Intelligence-Actuated Robot," which is incorporated herein by reference in its entirety.

The robot 216 may communicate with the agent 215, and the agent 215 may be configured to send actions determined via the policy 222. The policy 222 may take as input the state (e.g., a vector representation generated by the encoder model 203) and return an action to perform.

The robot 216 may send sensor data to the encoder model 203 via the agent 215. The encoder model 203 may take as input the sensor data from the robot 216. The encoder model 203 may use the sensor data to generate a vector representation (e.g., an embedding) indicating the state of the robot. The encoder model 203 may be trained via the encoder trainer 204.

The anomaly detection model 209 may receive vector representations from the encoder model 203 and determine whether each vector representation is anomalous or not (e.g., as described in connection with FIG. 1 above). Although only one encoder model 203 is shown in FIG. 2, there may be multiple encoder models. A first encoder model may send embeddings to the anomaly detection model 209 and a second encoder model may send embeddings to other components of the system 200.

The dynamics mode 1212 may be trained by the dynamics trainer 213 to predict a next state given a current state and action that will be performed in the current state. The dynamics model may be trained by the dynamics trainer 213 based on data from expert demonstrations (e.g., performed by the teleoperator).

The actor-critic model 206 may be a reinforcement learning model. The actor-critic model 206 may be trained by the actor-critic trainer 207. The actor-critic model 206 may be used to determine actions for the robot 216 to perform. For example, the actor-critic model 206 may be used to adjust the policy by changing what actions are performed given an input state.

The actor-critic model 206 and the encoder model 203 may be configured to train based on outputs generated by each model 206 and model 203. For example, the system 200 may adjust a first weight of the encoder model 203 based on an action determined by a reinforcement learning model (e.g., the actor-critic model 206). Additionally or alternatively, the system 200 may adjust a second weight of the reinforcement learning model (e.g., the actor-critic model 206) based on the state (e.g., an embedding) generated via the encoder model 203.

The reward model 223 may take as input a state of the robot 216 (e.g., the state may be generated by the encoder model 203) and output a reward. The robot 216 may receive a reward for completing a task or for making progress towards completing the task. The output from the reward model 223 may be used by the actor-critic trainer 207 and actor-critic model 206 to improve ability of the model 206 to determine actions that will lead to the completion of a task assigned to the robot 216. The reward trainer 224 may train the reward model 223 using data received via the teleoperation system 219 or via sampling data stored in the experience buffers 226. In some embodiments, the system 200 may adjust a weight of the reinforcement learning model (e.g., the actor-critic model 206) in response to determining that an embedding (e.g., generated by the encoder model 203) corresponds to an anomaly. Adjusting a weight of the reinforcement model may reduce a likelihood of the robot of performing an action that leads to an anomalous state.

The experience buffers 226 may store data corresponding to actions taken by the robot 216 (e.g., actions, observations, and states resulting from the actions). The data may be used to determine rewards and train the reward model 223. Additionally or alternatively, the data stored by the experience buffers 226 may be used by the actor-critic trainer to train the actor-critic model 206 to determine actions for the robot 216 to perform. The teleoperation system 219 may be used by the teleoperator 220 to control the robot 216 (e.g., as discussed above in connection with FIG. 1). The teleoperation system 219 may be used to record demonstrations of the robot performing the task. The demonstrations may be used to train the robot 216 and may include sequences of observations generated via the robot 216 (e.g., cameras, touch sensors, sensors in servomechanisms, or other parts of the robot 216).

Figure 3:
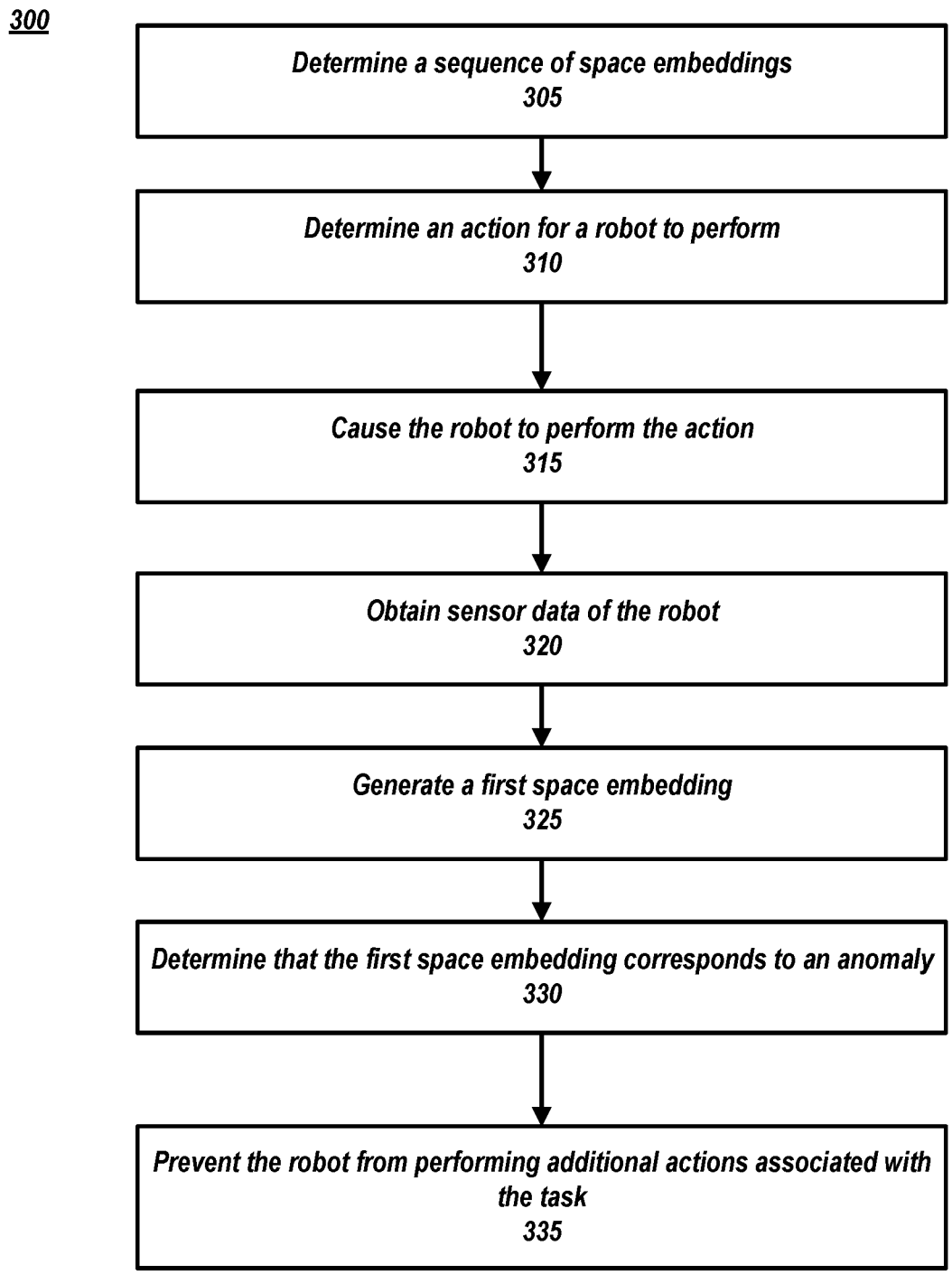
FIG. 3 shows an example flowchart of the actions involved in using machine learning to determine anomalous states in robot trajectories, in accordance with some embodiments.

FIG. 3 shows an example flowchart of the actions involved in detecting anomalies in robot states. For example, process 300 may represent the actions taken by one or more devices shown in FIG. 1-2 or FIG. 5. At 305, robot system 102 (e.g., using one or more components in system 100 (FIG. 1) and/or computing system 500 via I/O interface 550 and/or processors 510a-510n (FIG. 5)) determines a sequence of embeddings. Each embedding in the sequence of embeddings may be generated via a machine learning model (e.g., an embedding model as discussed in connection with FIG. 2). Each embedding of the sequence of embeddings may indicate a position of the robot or an orientation of an object being manipulated by the robot. wherein the sequence of embeddings is associated with a task that the robot has been instructed to complete.

At 310, robot system 102 (e.g., using one or more components in system 100 (FIG. 1) and/or computing system 500 via one or more processors 510a-510n and system memory 520 (FIG. 5)) determines an action for a robot to perform. The action may be determined based on the sequence of embeddings or based on a reinforcement learning model trained for performing the task.

At 315, robot system 102 (e.g., using one or more components in system 100 (FIG. 1) and/or computing system 500 via one or more processors 510a-510n, I/O interface 550, and/or system memory 520 (FIG. 5)) causes the robot to perform the action.

At 320, robot system 102 (e.g., using one or more components in system 100 (FIG. 1) and/or computing system 500 via one or more processors 510a-510n (FIG. 5)) obtains sensor data of the robot. The sensor data may include image data generated by a camera of the robot Additionally or alternatively, the sensor data may include an indication of a position of one or more components of the robot (e.g., a position of an arm, leg, body, wheel, tool, or other part).

At 325, robot system 102 (e.g., using one or more components in system 100 (FIG. 1) and/or computing system 500 (FIG. 5)) generates a first embedding indicating a state of the robot after performing the action. The first embedding may be generated based on inputting the sensor data into an embedding model.

At 330, robot system 102 (e.g., using one or more components in system 100 (FIG. 1) and/or computing system 500 (FIG. 5)) determines that the first embedding corresponds to an anomaly. The robot system 102 may determine that the first embedding corresponds to an anomaly based on inputting the first embedding into an anomaly detection model.

At 335, robot system 102 (e.g., using one or more components in system 100 (FIG. 1) and/or computing system 500 via the network interface 540 (FIG. 5)) prevents the robot from performing additional actions associated with the task.

It is contemplated that the actions or descriptions of FIG. 3 may be used with any other embodiment of this disclosure. In addition, the actions and descriptions described in relation to FIG. 3 may be done in alternative orders or in parallel to further the purposes of this dis closure. For example, each of these actions may be performed in any order, in parallel, or simultaneously to reduce lag or increase the speed of the system or method. Furthermore, it should be noted that any of the devices or equipment discussed in relation to FIGS. 1-5 could be used to perform one or more of the actions in FIG. 3.

Figure 4:
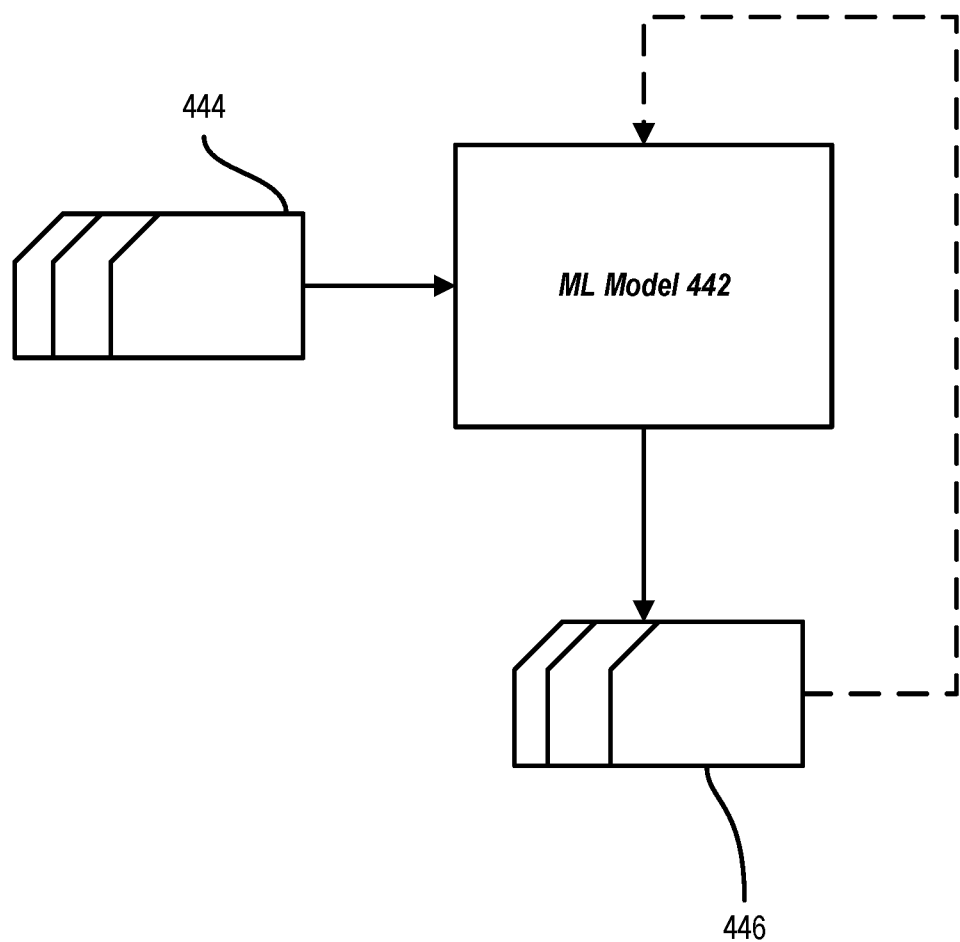
FIG. 4 shows an example machine learning model, in accordance with some embodiments.

One or more models discussed above may be implemented (e.g., in part), for example, as described in connection with the machine learning model 442 of FIG. 4. With respect to FIG. 4, machine learning model 442 may take inputs 444 and provide outputs 446. In one use case, outputs 446 may be fed back to machine learning model 442 as input to train machine learning model 442 (e.g., alone or in conjunction with user indications of the accuracy of outputs 446, labels associated with the inputs, or with other reference feedback and/or performance metric information). In another use case, machine learning model 442 may update its configurations (e.g., weights, biases, or other parameters) based on its assessment of its prediction (e.g., outputs 446) and reference feedback information (e.g., user indication of accuracy, reference labels, or other information). In another example use case, where machine learning model 442 is a neural network and connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 442 may be trained to generate results (e.g., response time predictions, sentiment identifiers, urgency levels, etc.) with better recall, accuracy, and/or precision.

In some embodiments, the machine learning model 442 may include an artificial neural network. In such embodiments, machine learning model 442 may include an input layer and one or more hidden layers. Each neural unit of the machine learning model may be connected with one or more other neural units of the machine learning model 442. Such connections can be enforcing or inhibitory in their effect on the activation state of connected neural units. Each individual neural unit may have a summation function which combines the values of one or more of its inputs together. Each connection (or the neural unit itself) may have a threshold function that a signal must surpass before it propagates to other neural units. The machine learning model 442 may be self-learning and/or trained, rather than explicitly programmed, and may perform significantly better in certain areas of problem solving, as compared to computer programs that do not use machine learning. During training, an output layer of the machine learning model 442 may correspond to a classification, and an input known to correspond to that classification may be input into an input layer of machine learning model during training. During testing, an input without a known classification may be input into the input layer, and a determined classification may be output. For example, the classification may be an indication of whether an action is predicted to be completed by a corresponding deadline or not. The machine learning model 442 trained by the ML subsystem 114 may include one or more embedding layers at which information or data (e.g., any data or information discussed above in connection with FIGS. 1-3) is converted into one or more vector representations. The one or more vector representations of the message may be pooled at one or more subsequent layers to convert the one or more vector representations into a single vector representation.

The machine learning model 442 may be structured as a factorization machine model. The machine learning model 442 may be a non-linear model and/or supervised learning model that can perform classification and/or regression. For example, the machine learning model 442 may be a general-purpose supervised learning algorithm that the system uses for both classification and regression tasks. Alternatively, the machine learning model 442 may include a Bayesian model configured to perform variational inference, for example, to predict whether an action will be completed by the deadline. The machine learning model 442 may be implemented as a decision tree and/or as an ensemble model (e.g., using random forest, bagging, adaptive booster, gradient boost, XGBoost, etc.).

Figure 5:
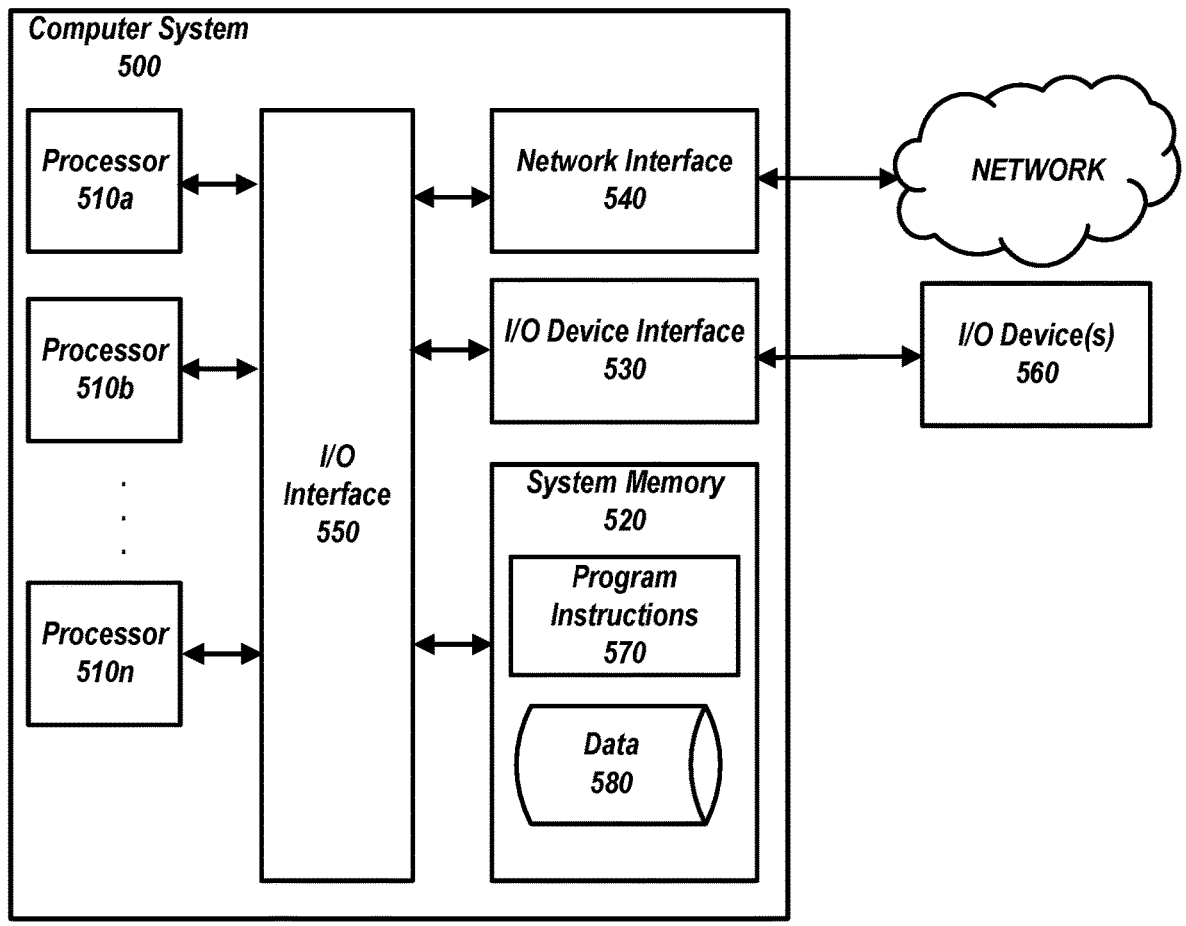
FIG. 5 shows an example computing system that may be used in accordance with some embodiments.

FIG. 5 is a diagram that illustrates an exemplary computing system 500 in accordance with embodiments of the present technique. Various portions of systems and methods described herein, may include or be executed on one or more computer systems similar to computing system 500. Further, processes and modules described herein may be executed by one or more processing systems similar to that of computing system 500.

Computing system 500 may include one or more processors (e.g., processors 510a-510n) coupled to system memory 520, an input/output I/O device interface 530, and a network interface 540 via an input/output (I/O) interface 550. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 500. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 520). Computing system 500 may be a units-processor system including one processor (e.g., processor 510a), or a multi-processor system including any number of suitable processors (e.g., 510a-510n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 500 may include a plurality of computing devices (e.g., distributed computer systems) to implement various processing functions.

I/O device interface 530 may provide an interface for connection of one or more I/O devices 560 to computing system 500. I/O devices may include devices that receive input (e.g., from a user) or output information (e.g., to a user). I/O devices 560 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computing system 500 through a wired or wireless connection. I/O devices 560 may be connected to computing system 500 from a remote location. I/O devices 560 located on remote computer system, for example, may be connected to computing system 500 via a network and network interface 540.

Network interface 540 may include a network adapter that provides for connection of computing system 500 to a network. Network interface may 540 may facilitate data exchange between computing system 500 and other devices connected to the network. Network interface 540 may support wired or wireless communication. The network may include an electronic communication network, such as the Internet, a local area network (LAN), a wide area network (WAN), a cellular communications network, or the like.

System memory 520 may be configured to store program instructions 570 or data 580. Program instructions 570 may be executable by a processor (e.g., one or more of processors 510a-510n) to implement one or more embodiments of the present techniques. Instructions 570 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 520 may include a non-transitory computer readable storage medium that may have program instructions stored thereon that are executable by a computer processor (e.g., one or more of processors 510*a*-510*n*) to cause the subject matter and the functional operations described herein. A memory (e.g., system memory 520) may include a single memory device and/or a plurality of memory devices (e.g., distributed memory devices).

I/O interface 550 may be configured to coordinate I/O traffic between processors 510*a*-510*n*, system memory 520, network interface 540, I/O devices 560, and/or other peripheral devices. I/O interface 550 may perform protocol, timing, or other data transformations to convert data signals from one component (e.g., system memory 520) into a format suitable for use by another component (e.g., processors 510*a*-510*n*). I/O interface 550 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 500 or multiple computer systems 500 configured to host different portions or instances of embodiments. Multiple computer systems 500 may provide for parallel or sequential processing/execution of one or more portions of the techniques described herein.

Those skilled in the art will appreciate that computing system 500 is merely illustrative and is not intended to limit the scope of the techniques described herein. Computing system 500 may include any combination of devices or software that may perform or otherwise provide for the performance of the techniques described herein. For example, computing system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 500 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 500 may be transmitted to computing system 500 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present disclosure may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several disclosures. Rather than separating those disclosures into multiple isolated patent applications, applicants have grouped these disclosures into a single document because their related subject matter lends itself to economies in the application process. But the distinct advantages and aspects of such disclosures should not be conflated. In some cases, embodiments address all of the deficiencies noted herein, but it should be understood that the disclosures are independently useful, and some embodiments address only a subset of such problems or offer other, unmentioned benefits that will be apparent to those of skill in the art reviewing the present disclosure. Due to costs constraints, some features disclosed herein may not be presently claimed and may be claimed in later filings, such as continuation applications or by amending the present claims. Similarly, due to space constraints, neither the Abstract nor the Summary sections of the present document should be taken as containing a comprehensive listing of all such disclosures or all aspects of such disclosures.

It should be understood that the description and the drawings are not intended to limit the disclosure to the particular form disclosed, but to the contrary, the intention is to cover all modifications, equivalents, and alternatives falling within the spirit and scope of the present disclosure as defined by the appended claims. Further modifications and alternative embodiments of various aspects of the disclosure will be apparent to those skilled in the art in view of this description. Accordingly, this description and the drawings are to be construed as illustrative only and are for the purpose of teaching those skilled in the art the general manner of carrying out the disclosure. It is to be understood that the forms of the disclosure shown and described herein are to be taken as examples of embodiments. Elements and materials may be substituted for those illustrated and described herein, parts and processes may be reversed or omitted, and certain features of the disclosure may be utilized independently, all as would be apparent to one skilled in the art after having the benefit of this description of the disclosure. Changes may be made in the elements described herein without departing from the spirit and scope of the disclosure as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Additionally, as used in the specification "a portion," refers to a part of, or the entirety of (i.e., the entire portion), a given item (e.g., data) unless the context clearly dictates otherwise. Statements in which a plurality of attributes or functions are mapped to a plurality of objects (e.g., one or more processors performing actions A, B, C, and D) encompasses both all such attributes or functions being mapped to all such objects and subsets of the attributes or functions being mapped to subsets of the attributes or functions (e.g., both all processors each performing actions A-D, and a case in which processor 1 performs action A, processor 2 performs action B and part of action C, and processor 3 performs part of action C and action D), unless otherwise indicated. Further, unless otherwise indicated, statements that one value or action is "based on" another condition or value encompass both instances in which the condition or value is the sole factor and instances in which the condition or value is one factor among a plurality of factors. The term "each" is not limited to "each and every" unless indicated otherwise. Unless specifically stated otherwise, as apparent from the discussion, it is appreciated that throughout this specification discussions utilizing terms such as "processing" "computing," "calculating," "determining" or the like refer to actions or processes of a specific apparatus, such as a special purpose computer or a similar special purpose electronic processing/computing device.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. An embodiment of a tangible, non-transitory, machine-readable medium storing instructions that when executed by one or more processors effectuate operations comprising: obtaining, with a computer system, access to a specification indicating which regions of an embedding sp ace are designated as anomalous relative to vectors in the embedding space characterizing past behavior of a first instance of a dynamical system; receiving, with the computer system, multi-channel input indicative of a state of a second instance of the dynamical system; and classifying, with the computer system, whether the state of the second instance of the dynamical system is anomalous by: encoding the multi-channel input into a vector in the embedding space; causing the specification to be applied to the vector; obtaining a result of applying the specification to the vector; and classifying whether the state of the second instance of the dynamical system is anomalous based on the result; and storing, with the computer system, the classification in memory.

2. The medium of embodiment 1, wherein: the first instance of the dynamical system comprises a robot having more than 15 degrees of freedom; the embedding space has between 10 and 2000 dimensions; the specification comprises an anomaly detection model trained on the vectors in the embedding space characterizing past behavior of a first instance of the dynamical system; and the computer system is part of the robot.

3. The medium of embodiment 1, the operations comprising determining the specification indicating which regions of the embedding space are designated as anomalous by: obtaining vectors in the embedding space characterizing past behavior of the first instance of a dynamical system; clustering the vectors in the embedding space characterizing past behavior of the first instance of a dynamical system to determine a plurality of clusters; and designating regions in the embedding space outside the plurality of clusters as anomalous.

4. The medium of embodiment 1, wherein: the first instance of the dynamical system comprises a robot; the robot is comprises a plurality of cameras; and output of the plurality of cameras is input to an encoder operative to encode video from the plurality of cameras as the vectors in the embedding space characterizing past behavior of a first instance of a dynamical system.

5. The medium of embodiment 4, wherein: the robot is controlled by a reinforcement learning model that takes as input vectors in the embedding space from the encoder; and the reinforcement learning model and the encoder are trained concurrently with end-to-end learning with a single objective function that is optimized by adjusting parameters of both the reinforcement learning model and of the encoder.

6. An embodiment of a system for classifying state or predicted state of a robot as anomalous, the system comprising: a server; and a robot comprising one or more processors and computer program instructions that, when executed, cause the one or more processors to perform operations comprising: determining a sequence of embeddings, wherein each embedding of encodes a time-slide of a plurality of channels of sensor data indicative of state of the robot and an environment of the robot in a lower-dimensional space than a dimensionality of the sensor data, the lower-dimensional space having more than 10 dimensions, wherein the sequence of embeddings is associated with a task that the robot has been instructed to complete; determining, based on the sequence of embeddings and based on a reinforcement learning model trained for performing the task, an action for the robot to perform; causing the robot to perform the action; obtaining sensor data of the robot, wherein the sensor data comprises image data generated by a camera of the robot, and wherein the sensor data comprises an indication of a position of a joint of the robot; generating based on inputting the sensor data into an embedding model, a first embedding indicating a state of the robot after, before, or while performing the action; classifying, with an anomaly detection model, based on the first embedding, that the first embedding corresponds to an anomaly; and in response to determining that the first embedding corresponds to an anomaly, preventing the robot from performing additional actions associated with the task.

7. The system of embodiment 6, wherein the anomaly detection model comprises a clustering model, and wherein determining that the first embedding corresponds to an anomaly comprises: determining that the first embedding does not correspond to any cluster of a plurality of clusters, wherein each cluster of the plurality of clusters comprises embeddings corresponding to tasks that the robot has been trained to complete.

8. The system of embodiment 6, wherein determining that the first embedding corresponds to an anomaly comprises: determining that the first embedding is not contained within a multidimensional area corresponding to a latent space associated with the first embedding.

9. The system of embodiment 6, wherein determining that the first embedding corresponds to an anomaly comprises: generating a similarity score by using a distance metric to compare the first embedding with a second embedding of the sequence of embeddings; determining that the similarity score is lower than a threshold similarity score; and in response to determining that the similarity score is lower than a threshold similarity score, classifying the first embedding as an anomaly.

10. The system of embodiment 6, wherein determining that the first embedding corresponds to an anomaly comprises: generating, based on inputting the first embedding into the anomaly detection model, a score indicative of whether the first embedding is an anomaly; and based on determining that the score fails to satisfy a threshold, causing the robot to continue to perform the task.

11. The system of embodiment 6, wherein the instructions, when executed, effectuate operations further comprising: generating, based on inputting the first embedding into the anomaly detection model, a score indicative of whether the first embedding is an anomaly; and based on determining that the score fails to satisfy a threshold, causing the robot to move to a charging station associated with the robot.

12. The system of embodiment 6, wherein the instructions, when executed, effectuate operations further comprising: in response to determining that the first embedding corresponds to an anomaly, sending an alert to a server, wherein the alert indicates that a teleoperator should take control over the robot.

13. The system of embodiment 6, wherein the sensor data comprises information obtained from a motor position sensor of the robot, a touch sensor located in a finger of the robot, a motor current sensor of the robot, and a depth camera of the robot.

14. The system of embodiment 6, further comprising: adjusting a first weight of the embedding model based on the action determined by the reinforcement learning model; and adjusting a second weight of the reinforcement learning model based on the first embedding generated via the reinforcement learning model.

15. The system of embodiment 6, further comprising: in response to determining that the first embedding corresponds to an anomaly, adjusting a weight of the reinforcement learning model, wherein adjusting the weight of the reinforcement learning model reduces a likelihood of the robot of performing an action associated with an anomalous embedding.

16. The system of embodiment 6, wherein a time of less than 100 milliseconds transpires between determining that the first embedding corresponds to an anomaly and preventing the robot from performing further actions.

17. The system of embodiment 6, wherein the server is configured to perform operations comprising: receiving data from a plurality of robots, wherein the plurality of robots comprises the robot; generating an updated anomaly detection model by training, based on the data, the anomaly detection model; and sending the updated anomaly detection model to the robot, wherein the data comprises embeddings generated by each robot of the plurality of robots and sensor data from each robot of the plurality of robots.

18. The system of embodiment 6, wherein in the instructions, when executed, effectuate operations further comprising:
in response to determining that the first embedding corresponds to an anomaly, sending a query to the server, wherein the query comprises the first embedding;
in response to sending the query to the server, receiving a second sequence of embeddings; and causing the robot to perform actions corresponding to the second sequence of embeddings.

19. The system of embodiment 6, wherein the server is configured to perform operations comprising: in response to receiving a query associated with the first embedding, determining based on the first embedding, an action for the robot to perform; and sending, to the robot, instructions for performing the action, wherein determining an action for the robot to perform comprises: comparing the first embedding with a plurality of embeddings, wherein each embedding of the plurality of embeddings corresponds to an anomaly, and wherein each embedding of the plurality of embeddings is associated with a sequence of embeddings generated from actions performed by a teleoperator; and based on comparing the first embedding with a plurality of embeddings, determining an action for the robot to perform, wherein the action comprises a second sequence of embeddings associated with the first embedding.

20. The system of embodiment 6, wherein the server is configured to perform operations comprising: receiving data from a plurality of robots, wherein the plurality of robots comprises the robot, wherein the data indicates anomalous embeddings generated by each robot in the plurality of robots; determining, based on the data, an area in an embedding space associated with the embeddings, wherein embeddings that are outside the area correspond to anomalies; and sending an indication of the area to the robot.

21. The system of embodiment 6, wherein the robot comprises a tendon-drive humanoid robot with more than 40 degrees of freedom, having two arms coupled to a torso, each arm having a shoulder, elbow, wrist joint, and a respective hand with five respective fingers.

22. The system of embodiment 6, wherein the robot comprises a self-driving automobile.

23. A method, comprising: the operations of any one of embodiments 1-22.

What is claimed is:
1. A system for detecting anomalous robot states, the system comprising:
a robot having a robot body with joints, the robot comprising one or more processors and computer program instructions that, when executed, cause the one or more processors to perform operations comprising:

determining a sequence of embeddings, wherein each embedding encodes a time-slice of a plurality of channels of sensor data indicative of a state of the robot and an environment of the robot in a lower-dimensional space than a dimensionality of the sensor data, the state of the robot comprising joint states of the robot, the lower-dimensional space having more than 10 dimensions, wherein the sequence of embeddings is associated with a specified task that the robot has been instructed to complete;

determining, based on the sequence of embeddings and based on a reinforcement learning model trained for performing the specified task, an action of the specified task for the robot to perform;

causing the robot to perform the action;

obtaining sensor data of the robot, wherein the sensor data comprises image data generated by a camera of the robot, and wherein the sensor data further comprises an indication of joint states of the robot;

generating, based on inputting the sensor data into an embedding model, a first embedding indicating a current state of the robot, wherein the current state of the robot comprises current joint states of the robot;

determining, with an anomaly detection model, based on the first embedding, that the first embedding corresponds to an anomaly in the current state of the robot, wherein the anomaly detection model is trained on a set of sequences of embeddings in an embedding space to identify an anomalous area or a non-anomalous area of the embedding space, wherein each sequence of embeddings in the set of sequences of embeddings corresponds to different movements of joints of a robot instance while the robot instance performed a task, and wherein each embedding in the sequence of embeddings encodes a plurality of channels of sensor data of the corresponding robot instance in the embedding space; and in response to determining that the first embedding corresponds to an anomaly in the current state of the robot, preventing the robot from performing additional actions associated with the specified task.

2. The system of claim 1, wherein the anomaly detection model comprises a clustering model, and wherein determining that the first embedding corresponds to an anomaly comprises:

determining that the first embedding does not correspond to any cluster of a plurality of clusters, wherein each cluster of the plurality of clusters comprises embeddings corresponding to tasks that the robot has been trained to complete.

3. The system of claim 1, wherein determining that the first embedding corresponds to an anomaly comprises:

determining that the first space embedding is not contained within a multidimensional volume corresponding to a bounding envelope in embedding space observed during training.

4. The system of claim 1, wherein determining that the first embedding corresponds to an anomaly in the current state of the robot comprises:

generating a similarity score by using a distance metric to compare the first embedding with a second embedding of the sequence of embeddings;

determining that the similarity score is lower than a threshold similarity score; and in response to determining that the similarity score is lower than a threshold similarity score, classifying the first embedding as an anomaly.

5. The system of claim 1, wherein determining that the first embedding corresponds to an anomaly in the current state of the robot comprises:

generating, based on inputting the first embedding into the anomaly detection model, a score indicative of whether the first embedding is an anomaly; and based on determining that the score fails to satisfy a threshold, causing the robot to continue to perform the specified task.

6. The system of claim 1, wherein the instructions, when executed, effectuate operations further comprising:

generating, based on inputting the first embedding into the anomaly detection model, a score indicative of whether the first embedding is an anomaly; and based on determining that the score fails to satisfy a threshold, causing the robot to move to a charging station associated with the robot.

7. The system of claim 1, wherein the instructions, when executed, effectuate operations further comprising:

in response to determining that the first embedding corresponds to an anomaly, sending an alert to a server, wherein the alert indicates that a teleoperator should take control over the robot.

8. The system of claim 1, wherein the sensor data comprises information obtained from a motor position sensor of the robot, a touch sensor located in a finger of the robot, a motor current sensor of the robot, and a depth camera of the robot.

9. The system of claim 1, further comprising:

adjusting a first weight of the embedding model based on the action determined by the reinforcement learning model; and adjusting a second weight of the reinforcement learning model based on the first embedding generated via the reinforcement learning model.

10. The system of claim 1, further comprising:

in response to determining that the first embedding corresponds to an anomaly in the current state of the robot, adjusting a weight of the reinforcement learning model, wherein adjusting the weight of the reinforcement learning model reduces a likelihood of the robot performing an action associated with an anomalous embedding.

11. The system of claim 1, wherein a time of less than 100 milliseconds transpires between determining that the first embedding corresponds to an anomaly in the current state of the robot and preventing the robot from performing further actions associated with the specified task.

12. The system of claim 1, wherein the system comprises a server and the server is configured to perform operations comprising:

receiving data from a plurality of robots, wherein the plurality of robots comprises the robot;

generating an updated anomaly detection model by training, based on the data, the anomaly detection model; and sending the updated anomaly detection model to the robot, wherein the data comprises embeddings generated by each robot of the plurality of robots and sensor data from each robot of the plurality of robots.

13. The system of claim 1, wherein the system comprises a server and the instructions, when executed, effectuate operations further comprising:

in response to determining that the first embedding corresponds to an anomaly, sending a query to the server, wherein the query comprises the first embedding;
in response to sending the query to the server, receiving a second sequence of embeddings; and
causing the robot to perform actions corresponding to the second sequence of embeddings.

14. The system of claim 1, wherein the system comprises a server and the server is configured to perform operations comprising:
in response to receiving a query associated with the first embedding, determining, based on the first embedding, an action for the robot to perform; and
sending, to the robot, instructions for performing the action, wherein determining an action for the robot to perform comprises:
comparing the first embedding with a plurality of embeddings, wherein each embedding of the plurality of embeddings corresponds to an anomaly, and wherein each embedding of the plurality of embeddings is associated with a sequence of embeddings generated from actions performed by a teleoperator; and
based on comparing the first embedding with a plurality of embeddings, determining an action for the robot to perform, wherein the action comprises a second sequence of embeddings associated with the first embedding.

15. The system of claim 1, wherein the system comprises a server and the server is configured to perform operations comprising:
receiving data from a plurality of robots, wherein the plurality of robots comprises the robot, wherein the data indicates anomalous embeddings generated by each robot in the plurality of robots;
determining, based on the data, an area in an embedding space associated with the embeddings, wherein embeddings that are outside the area correspond to anomalies; and
sending an indication of the area to the robot.

16. The system of claim 1, wherein the robot comprises a tendon-drive humanoid robot with more than 40 degrees of freedom, having two arms coupled to a torso, each arm having a shoulder, elbow, wrist joint, and a respective hand with five respective fingers.

17. A method of detecting anomalous robot states, the method comprising:
obtaining, with a computer system, access to an anomaly detection model trained on a set of sequences of embeddings in an embedding space to identify an anomalous area or a non-anomalous area of the embedding space, each sequence of embeddings in the set of sequences of embeddings corresponding to different movements of joints of a robot instance while the robot instance performed a task, each embedding in the sequence of embeddings encoding a plurality of channels of sensor data of the corresponding robot instance in the embedding space;
receiving, with the computer system, a multi-channel input comprising a plurality of channels of sensor data of a specified robot instance performing the task;
encoding, with the computer system, the multi-channel input into a new embedding vector in the embedding space, the new embedding vector representing a current state of the specified robot instance, wherein the current state comprises current joint states of the specified robot instance;
applying, with the computer system, the new embedding vector to the anomaly detection model to obtain a result;
determining, with the computer system, that the current state of the specified robot instance is an anomalous state based on the result of the anomaly detection model; and
triggering, with the computer system, a response to the anomalous state of the specified robot instance.

18. The method of claim 17, wherein the set of sequences of embeddings are generated from sensor data of multiple robot instances performing tasks.

19. The method of claim 17, wherein the anomaly detection model performs operations comprising:
applying the set of sequences of embeddings to a cluster model to generate clusters of embeddings; and
designating an area of the embedding space outside of the clusters of embeddings as anomalous.

20. The method of claim 19, wherein the anomaly detection model further performs operations comprising:
determining that the new embedding does not belong to any of the clusters.

21. The method of claim 17, wherein the new embedding is generated by an encoder communicatively coupled to a reinforcement learning model, and further comprising:
determining, by the reinforcement learning model, an action for the given robot instance based on an embedding in the embedding space; and
training the reinforcement learning model and the encoder concurrently with end-to-end learning with a single objective function that is optimized by adjusting parameters of both the reinforced learning model and the encoder.

22. The method of claim 17, wherein triggering, with the computer system, a response to the anomalous state of the given robot instance comprises storing the result of the anomaly detection model in memory.

23. A tangible, non-transitory, machine-readable medium storing instructions that when executed by one or more processors effectuate operations comprising:
obtaining, with a computer system, access to an anomaly detection model trained on a set of sequences of embeddings in an embedding space to identify an anomalous area or a non-anomalous area of the embedding space, each sequence of embeddings in the set of sequences of embeddings corresponding to different movements of joints of a robot instance while the robot instance performed a task, each embedding in the sequence of embeddings encoding a plurality of channels of sensor data of the corresponding robot instance in the embedding space;
receiving, with the computer system, a multi-channel input comprising a plurality of channels of sensor data of a specified robot instance performing the task;
encoding, with the computer system, the multi-channel input into a new embedding vector in the embedding space, the new embedding vector representing a current state of the specified robot instance, wherein the current state comprises current joint states of the specified robot instance;
applying, with the computer system, the new embedding vector to the anomaly detection model to obtain a result;
determining, with the computer system, that the current state of the specified robot instance is an anomalous state based on the result of the anomaly detection model; and triggering, with the computer system, a response to the anomalous state of the specified robot instance.

24. The method of claim 23, wherein triggering, with the computer system, a response to the anomalous state of the specified robot instance comprises storing the result of the anomaly detection model in memory.

* * * * *